United States Patent [19]

Wysk

[11] 4,336,469
[45] Jun. 22, 1982

[54] METHOD OF OPERATING A MHD POWER PLANT

[75] Inventor: Stanley R. Wysk, Suffield, Conn.

[73] Assignee: Combustion Engineering, Inc., Windsor, Conn.

[21] Appl. No.: 206,584

[22] Filed: Nov. 13, 1980

[51] Int. Cl.$^3$ .............................................. H02N 4/02
[52] U.S. Cl. ........................................................ 310/11
[58] Field of Search .............................. 310/11; 48/210

[56] References Cited

U.S. PATENT DOCUMENTS

| | | | |
|---|---|---|---|
| 3,459,975 | 8/1969 | Rosner | 310/11 |
| 3,467,842 | 9/1969 | Carrasse | 310/11 |
| 3,471,723 | 10/1969 | Maslau | 310/11 |
| 3,508,090 | 4/1970 | Crampton et al. | 310/11 |
| 3,531,664 | 9/1970 | Hals | 310/11 |
| 3,531,665 | 9/1970 | Rosa | 310/11 |
| 3,546,499 | 12/1970 | Somers | 310/11 |
| 4,200,815 | 4/1980 | Petrick et al. | 310/11 |
| 4,282,449 | 8/1981 | Bozzuto | 310/11 |

*Primary Examiner*—Donovan F. Duggan
*Attorney, Agent, or Firm*—William W. Habelt

[57] ABSTRACT

A fossil fuel is burned substoichiometrically in the combustor (10) of a MHD power plant to produce a high temperature, fuel-rich product gas (7). The product gas is passed through a MHD channel (12) to generate electricity. A reducing agent (9), preferably natural gas or hydrocarbon, is injected into the fuel-rich product gas (7) leaving the MHD generator (14); and the resulting mixture is held at a temperature in the range of 950° C. to 1500° C. for about 1 second to permit the reducing agent to decompose a portion of the nitrogen oxides formed in the combustor. The fuel-rich product gas (11) then passes thru an afterburner (18) wherein combustion is completed and any excess reducing agent is consumed.

7 Claims, 1 Drawing Figure

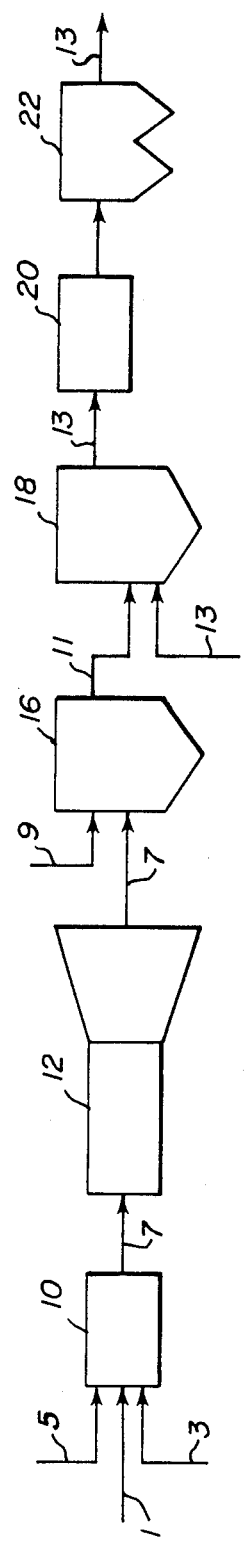

METHOD OF OPERATING A MHD POWER PLANT

BACKGROUND OF THE INVENTION

The present invention relates to an improved method of operating a magnetohydrodynamic power plant and, more specifically, to an improved method of operating a MHD power plant whereby the flue gas released to the atmosphere has a low content of nitrogen oxides.

The fundamental principles of generating electricity via a magnetohydrodynamic (MHD) power plant are well-known in the art. Basically, a high temperature, pressurized gas is produced in a combustor by burning a fossil fuel such as coal in air or oxygen. A seed material which is readily ionizable at the gas temperatures within the combustor is introduced into the gas to form the working fluid for the MHD generator. This working fluid is then passed through the MHD channel of the MHD generator wherein the working fluid passes at a high velocity through a magnetic field to generate electricity. The working fluid then exits the MHD generator through a diffuser section to various heat transfer sections and dust collection equipment disposed downstream of the MHD generator for cooling and cleaning the gas before it is vented to the atmosphere.

One of the major problems associated with generating electricity by magnetohydrodynamics is air pollution. In a typical prior art MHD power plant, coal is burned in air and under pressure to produce a gas having a temperature of approximately 2500 C. or more. At these temperatures, the formation of very high levels of oxides of nitrogen during the combustion process within the combustor is unavoidable. Nitrogen oxide concentrations in the gases leaving the combustor in the vicinity of 10,000 ppm are common.

Naturally, it is environmentally prohibitive to release such a concentration of nitroge oxides to the atmosphere. Therefore, the gas produced in the MHD combustor must be processed to reduce the nitrogen oxide concentration therein before the gases are vented to the atmosphere.

The most common method of reducing the nitrogen oxide content in the gases formed in the MHD combustor comprises placing a dwell chamber immediately downstream of the MHD generator. The gases leaving the diffuser section of the MHD generator are passed to the dwell chamber and held therein for a period of time of typically at least 2 seconds at a temperature above 1600 C. in order to allow the oxides of nitrogen in the gas to naturally decompose to an equilibrium concentration at the gas temperature within the dwell chamber. In order to ensure that the proper temperatures are maintained and sufficient residence time is provided for the nitrogen oxides to decompose, a typical dwell chamber is a fairly massive refractory-lined furnace structure which is expensive to build and takes up much space.

To further assist in reducing nitrogen oxide concentrations in the gas produced in the combustor, it is common in the prior art to burn the coal in the combustor at slightly substoichiometric conditions. In this manner, a slightly fuel-rich product gas is generated containing carbon monoxide which acts as a reducing agent to attenuate nitrogen oxides formation. A strong reducing atmosphere in effect accelerates the decomposition of the nitrogen oxides. Nevertheless, dwell chambers are still required even though the combustor is operated slightly substoichiometrically. Although the concentration of nitrogen oxides in the gas produced in the combustor is less when the fuel is burned with substoichiometric air, the residence time and the bgas temperature required in the dwell chamber to permit the oxides of nitrogen to decompose to their equilibrium leves is still prohibitively high.

In addition, when the fuel is burned in substoichiometric air in the combustor, a secondary furnace must be provided downstream of the dwell chamber to combust ay uncombusted fuel remaining in the bases before the gas can be vented to the atmosphere.

SUMMARY OF THE INVENTION

It is, therefore, an object of the present invention to provide an improved method of operating a MHD power plant whereby the level of nitrogen oxides in the gases emitted to the atmosphere is low.

In accordance with the present invention, a reducing agent is injected into the slightly fuel-rich product gas passing from the magnetohydrodynamic generator to the dwell chamber. This product gas with the reducing agent having been injected therein is held in the dwell chamber at a temperature of at least 950 C., and preferably less than 1500 C., for a period of approximately 1 second. The reducing agent is thereby permitted to react with the nitrogen oxides contained in the product gas to reduce a substantial portion of the nitrogen oxides to molecular nitrogen.

The reducing agent injected into the product gas is preferably injected at a rate of 1.0 to 1.5 moles of reducing agent per mole of nitrogen oxides contained in the product gas. A low nitrogen content combustible, such as natural gas or a hydrocarbon, particularly an aliphatic hydrocarbon, and more particularly a hydrocarbon from a group consisting of methane, ethane, butane, and propane, are preferred as reducing agents.

The use of a reducing agent in accordance with the present invention permits the temperature at which the gas must be held in the dwell chamber to be decreased from an excess of 1600 C. as in the prior art to a temperature as low as 950 C. Further, the residence time required within the dwell chamber is, in accordance with the present invention, reduced to as low as 1 second.

BRIEF DESCRIPTION OF THE DRAWINGS

The FIGURE is a schematic drawing of a magnetohydrodynamic power plant according to the present invention.

DETAILED DESCRIPTION OF THE INVENTION

Referring now to the drawing, there is depicted therein a typical open-cycle MHD power plant according to the present invention, which comprises a combustor 10, a MHD generator formed of a channel section 12 and a diffuser section 14, a dwell chamber 16 and afterburner furnace 18, a gas cooler 20, and a gas cleaner 22.

A fossil fuel 1, most typically coal, is burned in the combustor 10 in a stream of preheated oxidizer, such as air or oxygen, to form a product gas having a temperature of about 2500 C. In order to lessen the formation of nitric oxides during the combustion process, it is common to burn the fossil fuel substoichiometrically, that is in a fuel-rich atmosphere. Even when the combustor 10 is operated substoichiometrically, the nitrogen content of the product gas leaving the combustor may reach as high as 10,000 ppm. Additionally, the product gas leaving the combustor 10 contains other pollutants, mostly particulates, which must be cleaned from the product gas before it is vented to the atmosphere.

A seed material, i.e., a compound which readily ionizes at the high flame temperature within the combustor 10, such as carbonates of potassium or cesium, are injected into the combustor 10 to enhance electrical conductivity of the high temperature product gas 7. The product gas leaving the combustor 10 is accelerated through a nozzle to a high velocity and passed through the channel section 12 of the MHD generator. As the product gas passes therethrough, it traverses a magnetic field and as a result generates an electrical current. The product gas exits the MHD generator through a diffuser section 14 wherein the kinetic energy of the high velocity product gas leaving the channel section 12 of the MHD generator is recovered.

The high nitrogen oxides content product gas 7 leaving the diffuser section 14 passes to the dwell chamber 16 wherein the product gas 7 is held for a predetermined residence time above a particular minimum temperature in order to permit the nitrogen oxides content of the product gas to decay towards its equilibrium concentration at the temperature within the dwell chamber.

The reduced nitrogen oxides content product gas 11 is exhausted from the dwell chamber 16 into an afterburner furnace 18 wherein the remaining combustible matter in the product gas is burned in an air stream 13. Since the combustor 10 is operated sbustoichiometrically, there is a significant mount of combustible matter to be burned in the furnace 18. Accordingly, the afterburner furnace is typically a steam generating furnace wherein the heat generated in the afterburning process is utilized to generate steam which is most often then passed to a steam turbine to generate electricity.

Upon leaving the afterburner furnace 18, the completely combusted product gas 13 is further cooled in gas cooler 20 and cleaned of particulate matter in the gas cleaner 22 before being vented to the atmosphere.

As previously mentioned, the dwell chamber 16 is provided as a means for controlling the content of nitrogen oxides in the product gas released to the atmosphere. It is well-known in the prior art to hold the product gas within the dwell chamber for a period of time in order to allow the nitrogen oxides content of the product gas to decay to a reasonable level. The minimum temperature at which the gas is held in the dwell chamber must be high enough to ensure that the rate of decay is reasonably fast so that the size of the dwell chamber may be kept manageable while at the same time be low enough so that the equilibrium level of the nitrogen oxides at the temperature within the dwell chamber is at a reasonable emission level. It is well established in the prior art, that the minimum acceptable temperature level within such a dwell chamber is approximately 1600 C., at which a residence time within the dwell chamber of about 2 seconds is required to permit the nitrogen oxide content of the product gas to decay. The present invention provides a method of operating a MHD power plant to yield a product gas having a lower nitrogen oxide content than obtainable in the prior art with a dwell chamber as described above.

In accordance with the present invention, a nitrogen oxide reducing agent 9 is injected into the product gas 7 entering the dwell chamber 16, preferably at a rate of 1.0 to 1.5 moles reducing agent per mole of nitrogen oxides contained in the product gas, and the product gas and reducing agent mixture are held within the dwell chamber 16 for a period of time of about 1 second at a gas temperature about 950 C., and preferably for a period of about 1 second at a gas temperature in the range of 950 to 1500 C.

According to the invention, a low nitrogen combustible, such as natural gas or a hydrocarbon, preferably an aliphatic hydrocarbon and more preferably an aliphatic hydrocarbon from the group consisting of methane, ethane, butane, and propane, is the preferred nitrogen oxide reducing agent 9. The reducing agent is injected under pressure into the fuel-rich nitrogen oxide bearing product gas 7 as it enters the dwell chamber 16 through a plurality of nozzles disposed about the inlet through which the product gas 7 enters. Preferably, the nozzles are arrayed and directed so as to inject the reducing agent tangentially into the product gas stream thereby forming a vortex swirl to ensure rapid and efficient mixing of the reducing agent with the product gas.

For example, if natural gas, which is predominately methane, were used as the reducing agent in carrying out the present invention, the following reactions, inter alia, would occur within the dwell chamber between the injected methane and the nitrogen oxides in the product gas:

$$CH_4 + 4NO_2 \rightarrow 4NO + CO_2 + 2H_2O$$

$$2CH_4 + 6NO \rightarrow 2CO + 4H_2O + 3N_2$$

$$2CH_4 + 2NO \rightarrow 2HCN + 2H_2O + H_2$$

Provided that a reducing atmosphere is maintained in the dwell chamber, i.e., the combustor is operated substoichiometrically, the selective reduction of NO by methane or other hydrocarbons will occur at a reasonable rate in the temperature range of 950–1500 C. Although some hydrogen cyanide may be formed in the dwell chamber, the primary product formed via the reduction of the nitrogen oxides in the product gas is molecular nitrogen.

Because the reaction of the reducing agent with the nitrogen oxides in accordance with the present invention, whereby the nitrogen oxides are reduced to molecular nitrogen, occurs at a rate much faster than that at which the nitrogen oxides decay in the prior art dwell chambers, not only is the required residence time within the dwell chamber of the present invention reduced but also the corresponding minimum gas temperature which must be maintained within the dwell chamber is reduced. In the prior art, it was necessary to construct dwell chambers of large volume and of high temperature insulating refractory in order to provide sufficient time and maintain a gas temperature high enough within the dwell chamber for the nitrogen oxides to decay at a reasonable rate. By following the method of the present invention, it is not only possible to reduce the size of the required dwell chamber, but also to construct the dwell chamber out of low temperature refractory or even water-cooled walls because the maintenance of a gas temperature above 1600 C. is no longer required.

As mentioned previously, it is customary to inject air into the fuel-rich product gas leaving the dwell chamber to burn the remaining combustible content of the fuel-rich product gas. This combustion usually takes place in a steam generating furnace, termed as afterburner furnace, disposed immediately downstream of the dwell chamber. As the present invention contemplates using a combustible, such as natural gas or a hydrocarbon, as the preferred reducing agent, any excess reducing agent will be completely consumed in the afterburner furnace and not be emitted to the atmosphere as a pollutant. Additionally, any excess reducing agent will not be wasted as its heat content will be utilized to generate steam in the afterburner furnace.

Although any hydrogen cyanide formed in the dwell chamber will be oxidized to nitrogen oxide in the afterburning furnace, the nitrogen oxide content of the clean product gas 13 leaving the afterburning furnace will be much lower than the nitrogen oxide content of the product gas entering the dwell chamber.

Further, if a low nitrogen reducing agent is used as contemplated in the preferred embodiment of the present invention, the possibility of significant nitrogen oxide production in the afterburner furnace from the oxidation of nitrogen contained within the reducing agent itself as the reducing agent burns is eliminated. The production of significant amounts of nitrogen oxide in the afterburning furnace would be a serious drawback to using a high nitrogen content reducing agent such as ammonia.

I claim:

1. A method of operating a magnetohydrodynamic power plant comprising the steps of:
   a. combusting a fossil fuel substoichiometrically to produce a product gas having temperature of approximately 2500 C. and containing nitrogen oxides;
   b. passing the product gas through a magnetohydrodynamic channel to generate electricity;
   c. passing the product gas leaving the magnetohydrodynamic channel to a dwell chamber;
   d. injecting reducing agent into the product gas passing from the magnetohydrodynamic channel to the dwell chamber;
   e. holding the nitrogen oxides containing product gas in the dwell chamber at a temperature of at least 950 C. for a period of about 1 second, thereby permitting said reducing agent to react with the nitrogen oxides contained in the product gas to reduce a substantial portion of the nitrogen oxides to molecular nitrogen;
   f. combusting the product gas leaving the dwell chamber in air to completely oxidize any reducing agent remaining in the product gas leaving the dwell chamber; and
   g. venting the completely combusted, reduced nitrogen oxide content product gas to the atmosphere.

2. A method as recited in claim 1 wherein the step of injecting a reducing agent into the product gas comprises injecting said reducing agent into the product gas at the rate of 1.0 to 1.5 moles reducing agent per mole of nitrogen oxides contained in the product gas.

3. A method as recited in claim 2 wherein the step of holding the nitrogen oxides containing product gas in the dwell chamber at a temperature of at least 950 C. for a period of about 1 second comprises holding the nitrogen oxides containing product gas in the dwell chamber at a temperature in the range of 950 C. to 1500 C. for a period of about 1 second.

4. A method as recited in claims 1, 2, or 3 wherein said reducing agent is natural gas.

5. A method as recited in claim 1, 2, or 3 wherein said reducing agent is a low nitrogen content hydrocarbon.

6. A method as recited in claim 5 wherein said reducing agent is an aliphatic hydrocarbon.

7. A method as recited in claim 6 wherein said reducing agent is an aliphatic hydrocarbon from the group consisting of methane, ethane, butane, and propane.

* * * * *